United States Patent
Huber

(10) Patent No.: US 11,824,641 B2
(45) Date of Patent: Nov. 21, 2023

(54) ACCESS TO A SERVICE

(71) Applicant: TELIA COMPANY AB, Solna (SE)

(72) Inventor: Michael Huber, Täby (SE)

(73) Assignee: TELIA COMPANY AB, Solna (SE)

( * ) Notice: Subject to any disclaimer, the term of this patent is extended or adjusted under 35 U.S.C. 154(b) by 243 days.

(21) Appl. No.: 17/061,975

(22) Filed: Oct. 2, 2020

(65) Prior Publication Data

US 2021/0105268 A1 Apr. 8, 2021

(30) Foreign Application Priority Data

Oct. 4, 2019 (FI) ...................................... 20195851

(51) Int. Cl.
| | | |
|---|---|---|
| H04M 1/66 | (2006.01) | |
| H04M 1/68 | (2006.01) | |
| H04M 3/16 | (2006.01) | |
| H04L 9/40 | (2022.01) | |
| H04W 12/08 | (2021.01) | |
| H04W 12/64 | (2021.01) | |

(52) U.S. Cl.
CPC ........ *H04L 63/0853* (2013.01); *H04L 63/108* (2013.01); *H04W 12/08* (2013.01); *H04W 12/64* (2021.01)

(58) Field of Classification Search
CPC . H04L 63/0807; H04L 63/10; H04L 63/0853; H04L 67/18; H04W 12/64; H04W 63/108; H04W 12/08; H04W 4/02; H04W 12/0431; H04W 12/61; H04W 12/06; H04W 4/021; H04W 64/00; G06F 2221/2111; G06F 21/33; G06F 21/6218
See application file for complete search history.

(56) References Cited

U.S. PATENT DOCUMENTS 5,592,553 A * 1/1997 Guski ................... H04L 9/0822
380/29
5,615,277 A * 3/1997 Hoffman .............. G06K 9/6255
902/3

(Continued)

FOREIGN PATENT DOCUMENTS

| WO | 2007/061255 | 5/2007 |
| WO | 2015/104224 | 7/2015 |

OTHER PUBLICATIONS

Search Report for FI20195851, dated May 4, 2020, 2 pages.

(Continued)

*Primary Examiner* — Stephen M D Agosta
(74) *Attorney, Agent, or Firm* — NIXON & VANDERHYE

(57) ABSTRACT

The invention relates to a method for determining an access right to a service, the method comprises: receiving a service request, generating at least one token, the at least one token being broadcast by at least one beacon device; receiving a message comprising at least data interpretable as a token, data from which the at least one beacon device is identifiable and data from which a position of the terminal device is derivable. By applying the received pieces of data it is possible to determine if an access to the service may be granted to the terminal device. The invention also relates to a network controller, a communication system and a computer program product.

8 Claims, 4 Drawing Sheets

(56) References Cited

U.S. PATENT DOCUMENTS

| | | | | |
|---|---|---|---|---|
| 5,999,126 | A * | 12/1999 | Ito | G01S 19/48 |
| | | | | 342/465 |
| 6,259,923 | B1 * | 7/2001 | Lim | H04W 64/00 |
| | | | | 455/456.2 |
| 7,698,566 | B1 * | 4/2010 | Stone | H04L 63/08 |
| | | | | 713/186 |
| 7,762,470 | B2 * | 7/2010 | Finn | H04H 60/372 |
| | | | | 235/487 |
| 9,042,912 | B1 * | 5/2015 | Bunner | G06Q 50/01 |
| | | | | 455/456.1 |
| 10,243,945 | B1 * | 3/2019 | Kruse | H04L 63/126 |
| 10,349,216 | B1 | 7/2019 | Tran et al. | |
| 2003/0022674 | A1 * | 1/2003 | Shintai | H04W 60/04 |
| | | | | 455/456.1 |
| 2004/0268122 | A1 * | 12/2004 | Satarasinghe | H04W 12/068 |
| | | | | 380/278 |
| 2005/0066179 | A1 * | 3/2005 | Seidlein | G06Q 20/4014 |
| | | | | 713/182 |
| 2007/0091858 | A1 * | 4/2007 | Wu | H04L 63/107 |
| | | | | 370/338 |
| 2008/0132235 | A1 * | 6/2008 | Hancock | H04W 12/068 |
| | | | | 455/436 |
| 2008/0150677 | A1 * | 6/2008 | Arakawa | E02F 9/24 |
| | | | | 340/5.2 |
| 2008/0172713 | A1 * | 7/2008 | Kamendje | H04L 43/065 |
| | | | | 726/1 |
| 2008/0280626 | A1 * | 11/2008 | Choi | H04W 8/16 |
| | | | | 380/258 |
| 2009/0097459 | A1 * | 4/2009 | Jendbro | H04L 63/0838 |
| | | | | 370/338 |
| 2009/0222669 | A1 * | 9/2009 | Huang | G06Q 20/3224 |
| | | | | 370/310 |
| 2010/0083000 | A1 * | 4/2010 | Kesanupalli | G07C 9/37 |
| | | | | 340/5.82 |
| 2010/0199086 | A1 * | 8/2010 | Kuang | H04L 63/0869 |
| | | | | 726/5 |
| 2010/0229227 | A1 * | 9/2010 | Andre | H04L 9/3213 |
| | | | | 726/6 |
| 2012/0174211 | A1 * | 7/2012 | Suzuki | H04L 63/0838 |
| | | | | 726/18 |
| 2012/0198570 | A1 * | 8/2012 | Joa | G06F 21/6218 |
| | | | | 726/30 |
| 2012/0208557 | A1 * | 8/2012 | Carter | G01S 19/23 |
| | | | | 455/456.1 |
| 2013/0185779 | A1 * | 7/2013 | Tamai | H04L 63/0838 |
| | | | | 726/6 |
| 2013/0276082 | A1 * | 10/2013 | Kuang | H04L 63/0869 |
| | | | | 726/7 |
| 2013/0340071 | A1 * | 12/2013 | Vellozo Luz | G06F 21/36 |
| | | | | 726/18 |
| 2014/0115341 | A1 * | 4/2014 | Robertson | G06F 21/30 |
| | | | | 713/183 |
| 2014/0188733 | A1 * | 7/2014 | Granbery | G06Q 20/3829 |
| | | | | 705/64 |
| 2015/0073980 | A1 * | 3/2015 | Griffin | H04W 40/244 |
| | | | | 705/39 |
| 2015/0186874 | A1 * | 7/2015 | Govindarajan | G06Q 20/322 |
| | | | | 705/65 |
| 2015/0248702 | A1 * | 9/2015 | Chatterton | G06Q 30/0261 |
| | | | | 705/14.58 |
| 2015/0287014 | A1 * | 10/2015 | Granbery | H04W 4/029 |
| | | | | 705/44 |
| 2015/0289295 | A1 * | 10/2015 | Granbery | H04W 76/14 |
| | | | | 370/230 |
| 2015/0356563 | A1 * | 12/2015 | Vohra | G06Q 20/40145 |
| | | | | 705/44 |
| 2016/0057626 | A1 | 2/2016 | O'Toole et al. | |
| 2016/0192130 | A1 | 6/2016 | Kahn et al. | |
| 2016/0227507 | A1 * | 8/2016 | Uchino | G01S 5/14 |
| 2016/0241999 | A1 * | 8/2016 | Chin | G07C 9/00182 |
| 2016/0269403 | A1 * | 9/2016 | Koutenaei | H04L 63/102 |
| 2016/0284147 | A1 * | 9/2016 | Trani | G01S 5/0205 |
| 2016/0327629 | A1 * | 11/2016 | Pandharipande | G01S 5/0236 |
| 2016/0344091 | A1 * | 11/2016 | Trani | H01Q 9/0407 |
| 2016/0352751 | A1 | 12/2016 | Perrufel et al. | |
| 2017/0168135 | A1 * | 6/2017 | Want | H04W 4/33 |
| 2017/0208091 | A1 * | 7/2017 | Whitsell | H04W 4/023 |
| 2017/0228720 | A1 * | 8/2017 | Vaysman | G06F 3/16 |
| 2017/0280327 | A1 * | 9/2017 | Masuoka | H04L 63/0838 |
| 2017/0366971 | A1 * | 12/2017 | Iyer | H04W 12/068 |
| 2018/0083959 | A1 * | 3/2018 | Barbosa | H04W 12/068 |
| 2018/0331832 | A1 * | 11/2018 | Pulsifer | G06Q 20/3825 |
| 2019/0020479 | A1 * | 1/2019 | Antipa | H04L 63/062 |
| 2019/0058700 | A1 * | 2/2019 | Kurian | H04W 12/065 |
| 2019/0253324 | A1 * | 8/2019 | Kapinos | G10L 17/24 |
| 2019/0372989 | A1 * | 12/2019 | Shultz | H04L 63/083 |
| 2019/0373095 | A1 * | 12/2019 | Vissa | H04M 1/72403 |

OTHER PUBLICATIONS

European Search Report issued in European Patent Application No. EP 20 19 9738 dated Oct. 19, 2020.

Jansen, W. et al., "Proximity Beacons and Mobile Device Authentication: An Overview and Implementation," National Institute of Standards and Technology, Jun. 1, 2005.

* cited by examiner

| Session ID | UE id | Token |
|---|---|---|
| X | ID1 | qqq |
| Y | ID2 | www |
| Z | ID3 | eee |

| POSITION | SERVICE |
|---|---|
| A | 1 |
| B | 1, 2 |
| C | N/A |

ACCESS TO A SERVICE

This application claims priority to FI Patent Application No. 20195851 filed 4 Oct. 2019, the entire contents of which is hereby incorporated by reference.

TECHNICAL FIELD

The invention concerns in general the technical field of communications. More particularly, the invention concerns accessing to a service of a communication network.

BACKGROUND

Today wireless communication networks are available in almost every area. The wireless communication networks may be implemented as mobile communication networks or as wireless local area networks, such as Wi-Fi networks. As regards to the wireless local area networks there is typically arranged a network controller which is configured to control an operation of the wireless local area network and the devices, such as base stations, therein. One specific task of the network controller may be an access control of terminal devices to the wireless local area in question. For example, the network controller may be configured to receive network access requests from terminal devices and to determine, based on predetermined criteria, if the terminal device in question may access the wireless local network or not.

On the other hand there are a plurality of mechanisms by means of which it is possible to determine a position of a terminal device within an area. For especially outdoor positioning there is e.g. available a satellite-based positioning system, such as a GPS system, which is widely available. Further, there are a numerous number of solutions especially dedicated for indoor positioning, such as those which are based on so-called anchor nodes which are at known positions and which are configured to broadcast individual beacon signals. The terminal devices roaming within the area receive these beacon signals and based on those the terminal devices may determine its position, for example.

As may be seen from above the todays terminal devices are capable of utilizing different kinds of wirelessly transmitted data from different systems. On the other hand, it would be advantageous to utilize capabilities of different systems in order to achieve some further effect, such as an improved access control to a wireless communication network.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention.

The following summary merely presents some concepts of the invention in a simplified form as a prelude to a more detailed description of exemplifying embodiments of the invention.

An objective of the invention is to present a method, a network controller, a communication system and a computer program product for determining an access right to a communication service.

The objectives of the invention are reached by a method, a network controller, a communication system and a computer program product as defined by the respective independent claims.

According to a first aspect, a method for determining an access right to a service hosted by a network node is provided, the method comprises: receiving, by a network controller, a service request from a terminal device to access the service hosted by the network node; generating, by a network controller, at least one token associated to the service request received from the terminal device, the at least one token being broadcast by at least one beacon device; receiving, by the network controller, a message from a terminal device, the message comprising data interpretable as a token, data from which the at least one beacon device is identifiable and data from which a position of the terminal device is derivable; determining, by the network controller, an access right to the service by: determining at least on a basis the data interpretable as the token if the network controller has generated the token for the terminal device; and in response to a detection that the network controller has generated the token for the terminal device; determining the position of the terminal device from data from which the at least one beacon device is identifiable and from the data from which the position of the terminal device is derivable; and generating, in accordance with a result of a determination if the network controller has generated the token to the terminal device and the position of the terminal device, an indication representing a right to access to the service.

The method may further comprise a generation of a session by the network controller comprising at least the generated token associated with an identifier of the terminal device. For example, a determination if the network controller has generated the received token for the terminal device may be performed by querying from a data storage if it stores a session comprising the received token.

Further, a validity of the generated token is arranged to be limited in time. A verification of the validity of the token in time may be performed in a determination of the access right to the service.

The position of the terminal device may be derived from a measurement data transmitted by the terminal device to the network controller in the message.

Moreover, the measurement data may e.g. comprise at least one measurement value representing at least one parameter of a signal broadcast by the at least one beacon device experienced by the terminal device.

The service may be provided to the terminal device in response to a detection that the generated indication represents an allowance of a service provision.

According to a second aspect, a network controller is provided, the network controller comprising: at least one processor; at least one memory including computer program code; the at least one memory and the computer program code configured to, with the at least one processor, cause the network controller to perform: receive a service request from a terminal device to access the service hosted by the network node; generate at least one token associated to the service request received from the terminal device, the at least one token being broadcast by at least one beacon device; receive a message from a terminal device, the message comprising data interpretable as a token, data from which the at least one beacon device is identifiable and data from which a position of the terminal device is derivable; determine an access right to the service by: determining at least on a basis the data interpretable as the token if the network controller has generated the token for the terminal device; and in response to a detection that the network controller has generated the token for the terminal device: determining the position of the terminal device from data from which the at least one beacon device is identifiable and from the data from which the position of the terminal device is derivable, and generating, in accordance with a result of a determination if the network controller has generated the token to and the position of the terminal device, an indication representing a right to access to the service.

The network controller may further be arranged to perform: a generation of a session comprising at least the generated token associated with an identifier of the terminal device. For example, the network controller may be arranged to perform: a determination if the network controller has generated the received token for the terminal device by querying from a data storage if it stores a session comprising the received token.

The network controller may be arranged to define a limited validity of the generated token in time. For example, the network controller may be arranged to verify the validity of the token in time in the determination of the access right to the service.

Still further, the network controller may be arranged to derive the position of the terminal device from a measurement data transmitted by the terminal device to the network controller in the message.

Alternatively or in addition, the network controller may be arranged to derive the position on a basis of at least one measurement value representing at least one parameter of a signal broadcast by the at least one beacon device experienced by the terminal device.

Moreover, the network controller may be arranged to provide the service to the terminal device in response to a detection that the generated indication represents an allowance of a service provision.

According to a third aspect, a communication system is provided, the communication system comprising: at least one network controller, and at least one beacon device, wherein the system the at least one network controller is arranged to: receive a service request from a terminal device to access the service hosted by the network node; generate at least one token associated to the request from the terminal device; receive a message from a terminal device, the message comprising data interpretable as a token, data from which the at least one beacon device is identifiable and data from which a position of the terminal device is derivable; determine an access right to the service by: determining at least on a basis the data interpretable as the token if the network controller has generated the token for the terminal device; and in response to a detection that the network controller has generated the token for the terminal device: determining the position of the terminal device from data from which the at least one beacon device is identifiable and from the data from which the position of the terminal device is derivable; and generating, in accordance with a result of a determination if the network controller has generated the token to the terminal device and the position of the terminal device, an indication representing a right to access to the service; and wherein the system the at least one beacon device is arranged to: broadcast the at least one token received from the at least one network controller.

According to a fourth aspect, a computer program product for determining an access right to a service is provided which computer program product, when executed by at least one processor, cause a network controller to perform the method in accordance with the first aspect above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIG. 1 illustrates schematically a communication environment into which the present invention may be implemented to.

FIG. 3 illustrates schematically a data structure according to an embodiment of the invention.

FIG. 4 illustrates schematically another data structure according to an embodiment of the invention.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figures 1, 3, 4:
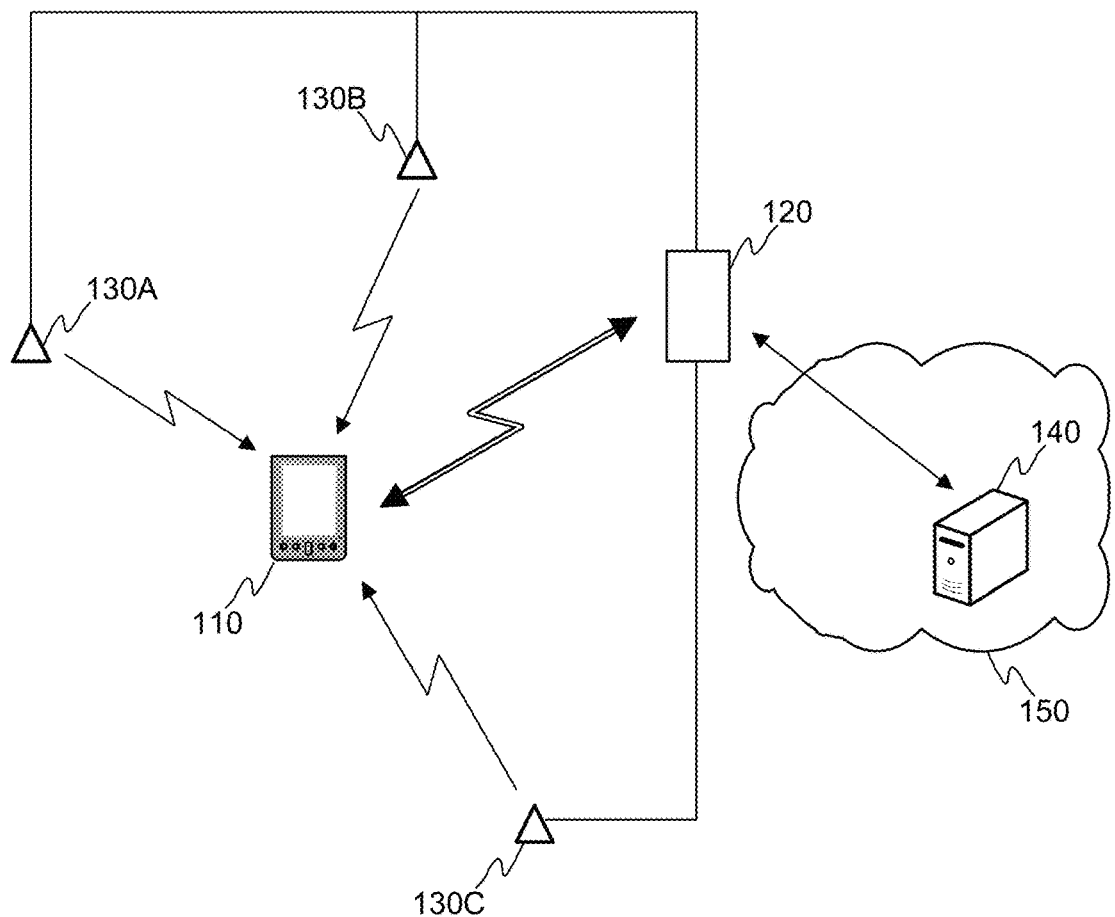

FIG. 1 illustrates schematically a communication environment into which the present invention may be implemented to. The communication system according to an embodiment of the invention may comprise at least one network controller 120 and at least one beacon device 130A, 130B, 130C for serving a mobile terminal device 110 which may roam within the area. The term 'area' shall be understood in a broad manner e.g. covering both indoor areas and outdoor areas in which the wireless local area network controlled by at least one network controller 120 may be available and wherein it is arranged a positioning system comprising one or more beacon devices 130A, 130B, 130C arranged to transmit beacon signals receivable by the terminal device 110. In the non-limiting example as schematically illustrated in FIG. 1 the network controller 120 is arranged to provide a short-range wireless communication network, such as a Wi-Fi network, for use in the area i.e. the network controller 120 may e.g. be configured to perform a functionality of a base station among other tasks or to control one or more base stations arranged in the area. Moreover, the network controller 120 may be, according to an embodiment of the present invention, communicatively coupled to the beacon devices 130A, 130B, 130C either directly or indirectly. The communicative coupling may be implemented in a wired or a wireless manner. As is commonly known the network controller 120 may establish a communication path to the terminal device 110 towards a service implemented in a network node 140, such as in a server. The network node 140 may, thus, be accessible over a communication network 150, such as the Internet if an access right is provided to the terminal device 110 by the network controller 120 in a manner as will be described. Furthermore, the beacon devices 130A, 130B, 130C may be configured to transmit the beacon signals with an applicable wireless communication technology, such as Wi-Fi, Li-Fi or Bluetooth. In some embodiment it may be arranged that the beacon device 130A, 130B, 130C is arranged in a base station implementing a service for the wireless local area network in question.

Figure 2:
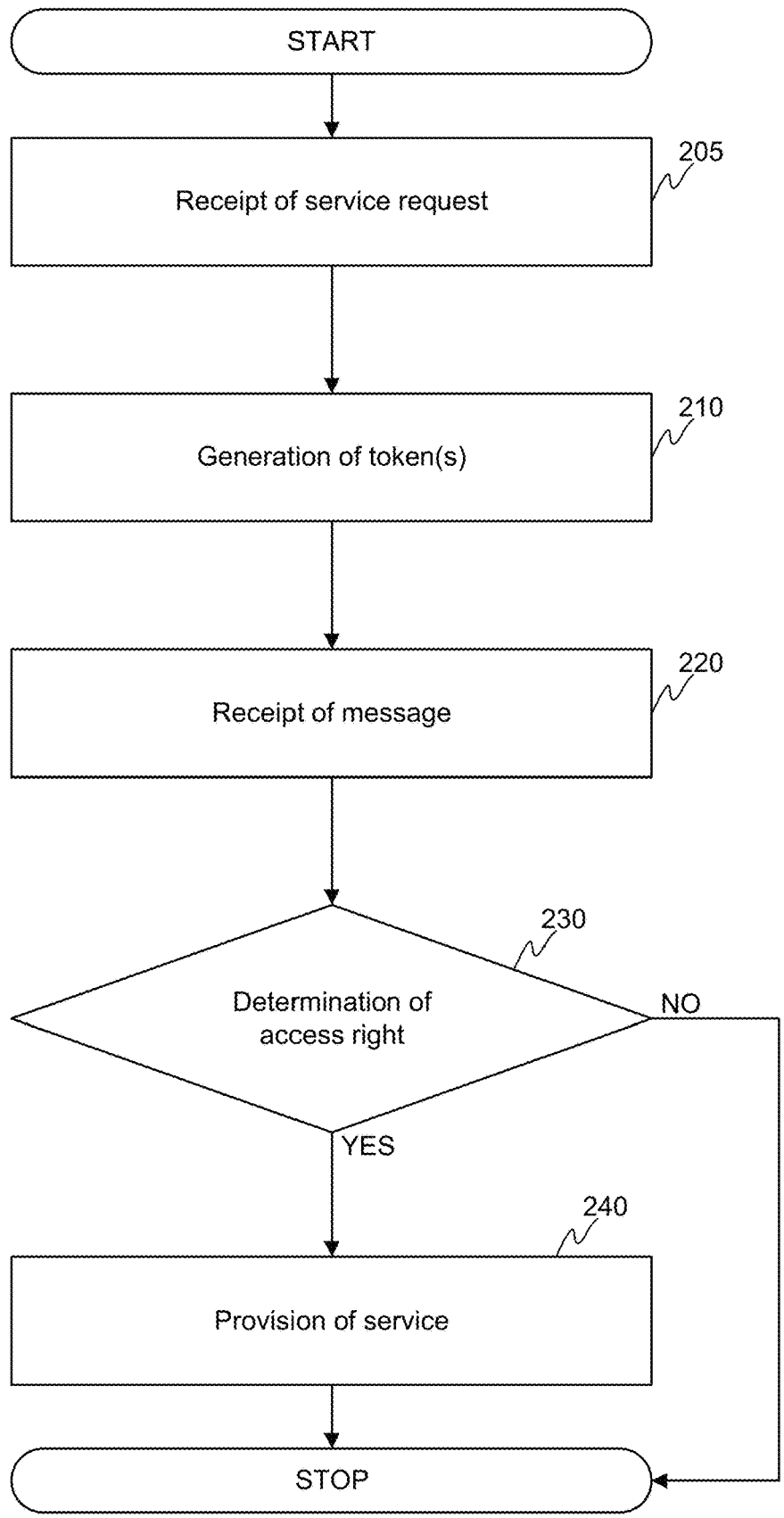
FIG. 2 illustrates schematically a method according to an embodiment of the invention.

Next, some aspects of the present invention are discussed by referring to FIG. 2 in which a method according to an embodiment of the invention is schematically illustrated. The method of FIG. 2 is disclosed from a perspective of the network controller 120. For sake of clarity it is worthwhile to mention that the terminal device 110 has entered to a service area of a Wi-Fi network controllable at least in part by the network controller 120 e.g. through an operation of the base station of the Wi-Fi network. The terminal device 110 may be coupled to the Wi-Fi network, or similar as a guest device, or if the Wi-Fi network is a password protected, the coupling may be arranged by providing the password by the user through a user interface of the terminal device 110 if the user is aware of the password. In any case it is assumed hereby that the terminal device is communicatively coupled to the network controller 120 through a network, such as the Wi-Fi or any other similar wireless local area network or even over a wide area network.

Regarding Step 205:

The user of the terminal device 110 is willing to access a service hosted by the network node 140. The service may be considered as a communication service in which data is exchanged between the communicating entities. For example, the service may e.g. be a location based data provision service from the network node 140 as a non-limiting example.

Now, the network controller 120 may receive a service request from the terminal device 110. The service request may carry an indication that the terminal device 110 intends to use the service hosted by the network node 140. Moreover, the service request may carry data from which the terminal device 110, or its user, is identifiable. Alternatively or in addition, the network controller 120 may generate a session identifier for maintaining data in the network controller 120, or in any data storage accessible by it.

In accordance with above the network controller 120 may maintain a data structure on pending sessions managed by it. The data structure may e.g. correspond to one schematically illustrated in FIG. 3. The data structure may maintain an identifier for the session (Session ID) as well as an identifier of the terminal device 110 (UE id) and a token associated to the session identifier. The data structure of FIG. 3 is a non-limiting example and it may comprise more or less data in accordance with the implementation and the application area. Aspects relating to the token will be discussed in the forthcoming description.

Regarding Step 210:

According to an embodiment of the invention the network controller 120 may be configured to generate one or more tokens for the beacon devices 130A, 1308, 130C in response to a receipt of the service request 205 from the terminal device 110. The token may be a data string which is to be included in the beacon signal by the beacon device 130A, 1308, 130C in question. The token may e.g. be a data string comprising one or more randomly generated characters. The token is generated in order to establish a data string by means of which it is possible to associate further requests to the session in question. In some embodiments the token may comprise data representing the session identifier.

Based on above the token generated by the network controller 120 is terminal device 110 specific and common for all beacon devices 130A, 130B, 130C, but each beacon device 130A, 130B, 130C may add further data, such as its identifier associated to the token before broadcasting it.

Still further, the generation of the tokens 210 may be arranged so that the network controller 120 may be arranged to renew the generated tokens at intervals for each terminal device 110. In other words, the network controller 120 may be configured to generate new tokens at predetermined intervals and configured to deliver the new tokens, or the token, to the beacon devices 130A, 130B, 130C for broadcasting. The renewal may e.g. be arranged to occur in every X second, such as in every 5th second.

As mentioned for the purpose of describing at least some aspects of the present invention it is hereby assumed that at least one terminal device 110 roams within the service area of the wireless local area network controlled by the network controller 120 and may be communicatively coupled to one or more beacon devices 130A, 130B, 130C and the network controller 120 in the manner as will be described. As a result, the terminal device 110 may receive at least the token with beacon specific data, such as beacon identifier (ID), from each of the beacon devices 130A, 130B, 130C. Additionally, the terminal device 110 may listen to additional information if any (e.g. relating to the positioning). Such additional information may e.g. be signal strength related information, time related information or anything similar which typically relates to the positioning method used in the positioning system. Alternatively or in addition, the terminal device 110 may be arranged to measure one or more parameters of the received signals from the beacon devices 130A, 130B, 130C. Hence, the parameters to be measured may e.g. be received signal strength, angle of arrival or time of arrival as non-limiting examples. For sake of clarity the received signals from the plurality of the beacon devices 130A, 130B, 130C may carry any kind of data from which it is possible to determine the position of the terminal device 110 with a predetermined accuracy either directly or indirectly.

Regarding Step 220:

At an instant of time the terminal device 110 may be arranged to request a service hosted by the network node 140 by generating a message to the network controller 120. According to an embodiment of the invention the terminal device 110 may be arranged to generate the message so that it is arranged to include at least information on one or more tokens received from the beacon devices 130A, 1308, 130C with the additional information relating to the positioning as well as data from which the at least one beacon device (130A, 130B, 130C) is identifiable, such as one or more identifiers of the beacon devices 130A, 1308, 130C in the message. For example, the terminal device 110 may be arranged to execute at least one application which may perform the mentioned operations and generate the message accordingly. According to an embodiment of the invention the application may e.g. include a predetermined number of tokens and additional data in the request in order to enable the network controller 120 to determine an access right as will be described in the forthcoming description. The identifier of the terminal device, or the subscriber, may be included, or associated, in the message. The pieces of information may be arranged to be delivered once or in a periodic manner.

In various embodiments the message may comprise information on a service the terminal device 110 is willing to use. The information of the service may e.g. comprise an identifier, such as a communication network address, of the network node 140 arranged to provide the requested service or service identifier, for example.

Hence, in step 220 the network controller 120 may be arranged to receive the message generated by the terminal device 110 as described. According to an embodiment of the invention the network controller 120 may be arranged to detect from the message the mentioned pieces of information for further use.

Regarding Step 230:

In response to the receipt of the message carrying the pieces of data as described the network controller 120 may be arranged to determine an access right of the terminal device 110 to the requested service. The requested service may e.g. refer to an access to the network node 140, and data or application therein, through the network controller 120 as a non-limiting example. The determination of the access right may comprise a step in which the network controller determines if data in the message interpretable as a token includes a data string corresponding one that is generated by the network controller 120. In other words, the network controller 120 may be arranged to maintain a data structure, such as schematically illustrated in FIG. 3, implemented e.g. as a database for storing the generated token and the data associated to the token. Now, the network controller 120 may be arranged to generate a query towards the data structure wherein the query comprises at least the data string of the data interpretable as the token as a parameter. Moreover, the query may also comprise an identifier of the beacon device 130A, 130B, 130C as another parameter. The data structure may return a response if the token in the query exists in the data structure or not, and in that manner, it is possible to confirm that the terminal device 110 in question really has requested the service. In some embodiments in which the message carries also an identifier of the terminal device 110, it is possible to perform the inquiry with both the token and the identifier of the terminal device. This kind of implementation especially ties the message and the original service request together.

According to various example embodiments if a response to the query indicates that the network controller 120 manages such a session for the terminal device 110 the network controller 120 may be arranged to derive the additional information from the message. On a basis of the additional information the network controller 120 may determine a position of the terminal device 110 in a manner specific to an applied positioning system or mechanism. The determination of the position may refer to an implementation in which the pieces of additional information from the plurality of the beacon devices 130A, 130B, 130C are used as such e.g. by comparing the pieces of information to corresponding comparison values. Alternatively or in addition, the network controller 120 may be arranged to determine the position of the terminal device 110 based on the pieces of additional information. For example, the position may be determined on a basis of received signal strengths from at least three beacon devices 130A, 130B, 130C in a commonly known manner.

In response to the determination of at least the position, but also by utilizing the other pieces of data in the described manner the network controller 120 may be configured to determine 230 if an access may be granted to the terminal device 110 to the requested service. According to an embodiment of the invention the determination may be based, at least in part, to a comparison of the position information of the terminal device 110 to information defining access rights to one or more services in accordance with a position. In other words, the network controller 120 may be arranged to have access to information defining the access rights to the service in accordance with the position. The information may be stored in data storage accessible to the network controller 120, such as in an internal memory of the controller 120. According to an embodiment the network controller 120 may be arranged to inquire from the data storage the access right e.g. by including the position information to the inquiry possibly with other information. The other information may e.g. be piece of data defining a requested service. By means of the mentioned parameters the data storage, implemented e.g. as a database, may be arranged to return a piece of information indicating if the terminal device 110 may be provided access to the requested service or not in the position it resides.

Regarding Step 240:

In response to a detection, in the step 230, that the terminal device 110 may be provided access to the service, necessary steps are taken for providing the service to the terminal device 110. This may comprise, but is not limited to, a generation of an acknowledgement signal to the terminal device 110, but possibly also a generation of a signal towards the requested service, such as towards the network node 140 hosting the service, by the network controller 120. Moreover, the network controller 120 may be arranged to establish a session internally for monitoring purposes.

As becomes clear from the FIG. 2 in response to a detection that the terminal device 110 may not be granted an access to the service, the process may be discontinued at least temporarily. According to an embodiment of the invention the network controller 120 may be arranged to generate an information message to the terminal device 110 in order to inform e.g. the user of the terminal device on a non-access to the service. Further instructions may be included in the information message.

FIG. 4 illustrates schematically a non-limiting example of a data structure which may be maintained in the data storage accessible by the network controller 120. The data structure may define services (e.g. service 1, service 2, none (N/A)) accessible from different positions (A, B, C) within the area. The positions may define one or more point-like positions within the area, or they may define sub-areas (i.e. a plurality of point-like positions) of the area. Now, if the network controller 120 defines, based on the information received from the terminal device 110, that the terminal device 110 resides in a certain area, the network controller 120 may receive, in response to the query, information defining the service or services available for the terminal device 110 from the position the terminal device 110 resides. Naturally, other criteria may exist for accessing the service, such as to verify a validity of the token as described above e.g. if they are valid only a predefined period of time. The validity may e.g. be checked on a basis of validity time included in the token or alternatively by comparing an instant of time of the generation of the token to a reference time window defining time window the token in question should have been generated in order to be valid.

As may be derived from the description above the terminal device 110 and the network controller 120 may establish a communication connection e.g. over the communication technology the wireless local area network is implemented to. This may e.g. be achieved so that an application executed in the terminal device 110 is arranged to detect wireless local area networks, such as Wi-Fi networks, in the area the terminal device 110 is roaming and initiate a communication with the network controller 120 controlling the wireless local area network e.g. through a base station. The communication with the network controller 110 comprises at least some of the method steps as described e.g. in the context of the description of FIG. 2.

Figure 5:
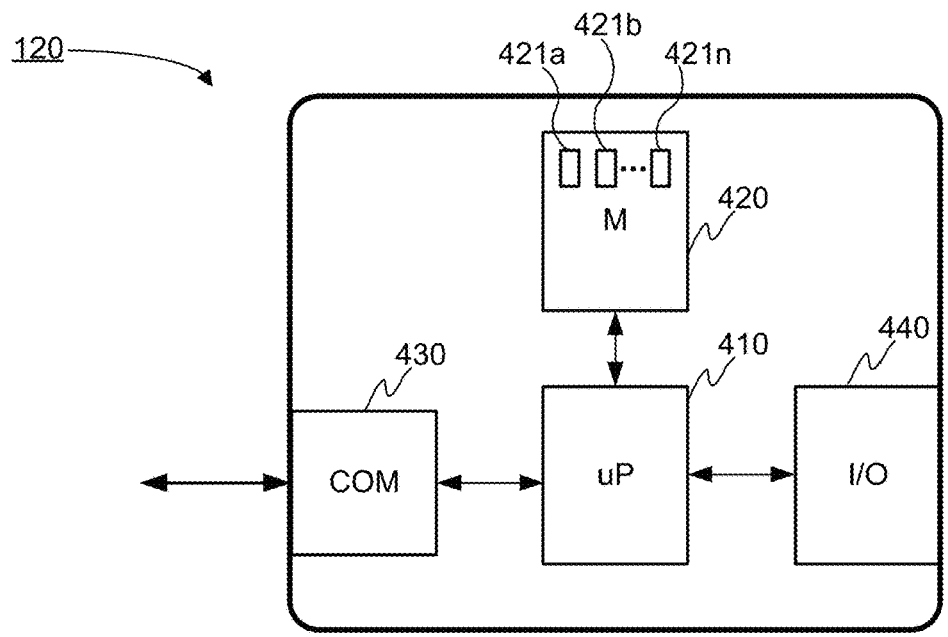
FIG. 5 illustrates schematically a network controller according to an embodiment of the invention.

An example of a network controller device 120 according to an embodiment of the invention is schematically illustrated in FIG. 5. The network controller 120 may be configured to implement at least part of the method for determining access right to at least one service as described. The execution of the method, or at least some portions of it, may be achieved by arranging at least one processor 410 to execute at least some portion of computer program code 421a-421n stored in at least one memory 420 causing the processor 410, and, thus, the network controller 120 to implement one or more method steps as described. In other words, the processor 410 may be arranged to access the memory 420 and to retrieve and to store any information therefrom and thereto. Moreover, the processor 410 may be configured to control a communication through one or more communication interfaces 430 for accessing a communication network 150, but also to the beacon devices 130A, 130B, 130C, the terminal device 110 and other entities, such as data storage, as described. Hence, the communication interface 430 may be arranged to implement, possibly under control of the processor 410, corresponding communication protocols, such as an IP and/or a protocol implemented by the wireless local area network, for communicating with one or more entities. The term communication interface 430 shall be understood in a broad manner comprising necessary hardware and software elements, such as antenna(s) and TX/RX radio parts, for implementing the communication techniques. Further, the network controller 120 in question may comprise one or more input/output devices 440 for inputting and outputting information. Such input/output devices may e.g. be keyboard, buttons, touch screen, display, loudspeaker, microphone camera and so on. In some implementation of the network controller 120 at least some of the input/output devices may be external to the network controller 120 and coupled to it either wirelessly or in a wired manner. For sake of clarity, the processor 410 herein refers to any unit or a plurality of units suitable for processing information and control the operation of the network controller 120 in general at least in part, among other tasks. The mentioned operations may e.g. be implemented with a microcontroller solution with embedded software. Similarly, the invention is not limited to a certain type of memory 420, but any memory unit or a plurality of memory units suitable for storing the described pieces of information, such as portions of computer program code and/or parameters, may be applied in the context of the present invention. Moreover, at least the mentioned entities may be arranged to be at least communicatively coupled to each other with an internal data connection, such as with a data bus.

Some aspects of the present invention may relate to a computer program product which, when executed by at least one processor, cause a network controller 120 to perform at least some portions of the method as described.

Figure 6:
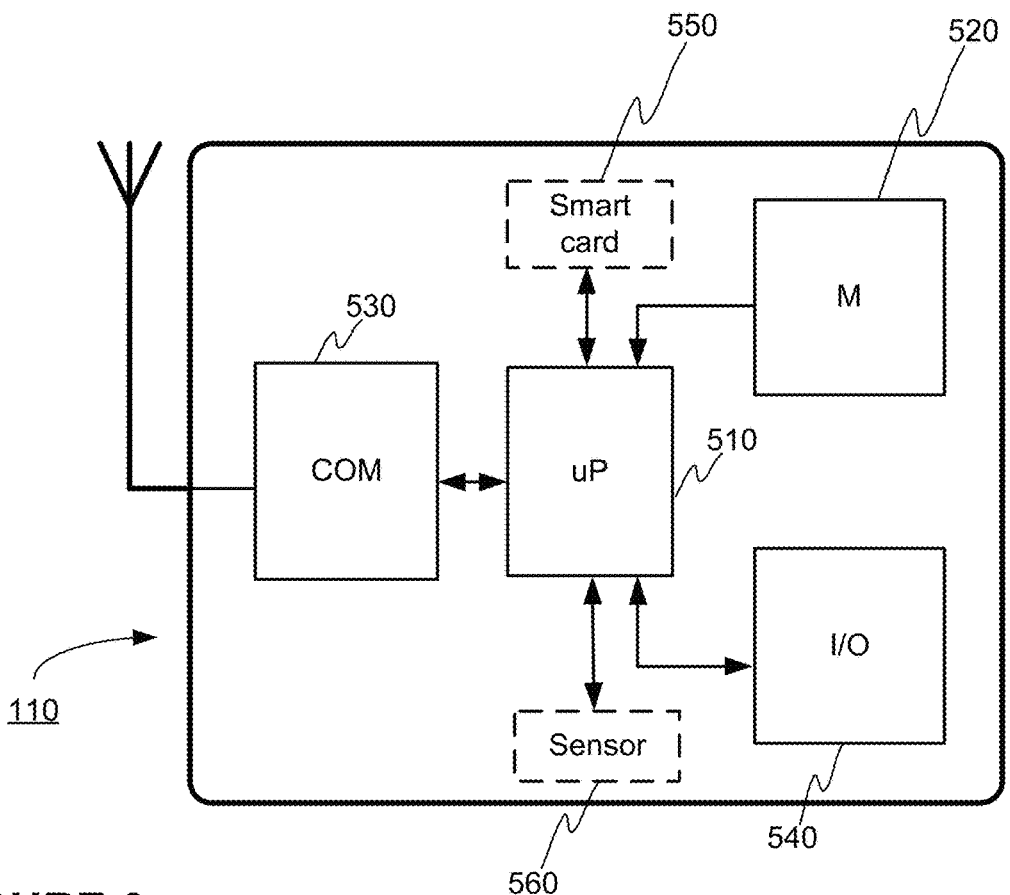
FIG. 6 illustrates schematically a terminal device according to an embodiment of the invention.

FIG. 6 illustrates schematically a non-limiting example of a terminal device 110 suitable of utilizing the invention and, hence, interworking with the invention. The terminal device 110 may comprise at least one processor 510 arranged to control an operation of the terminal device 110. The terminal device 110 may also comprise at least one memory 520, at least one communication interface 530 and one or more input/output devices 540 for inputting and outputting information. The memory 520 may be arranged to store computer program code, but also further data, such as parameter data and any other data e.g. obtained and generated by the terminal device 110. Further, the input/output devices 540 may correspond the ones mentioned in the context of the network controller 120, for example. Further, the terminal device 110 may comprise a smart card 550 which may be needed e.g. in accessing to a wireless communication network, such as to a mobile communication network. For example, the smart card may operate as a subscriber identity module (SIM) for the mobile communication network. Still further, the terminal device 110 may comprise one or more sensors for obtaining measurement data. In some embodiment, the sensor 560 may obtain information for positioning the terminal device 110.

The communication interface 530 of the terminal device 110 refers to hardware and software implementation by means of which the terminal device 110 may be arranged, e.g. under control of the processor 510, to communicate with one or more communication technologies with other entities. Hence, the terminal device 110 is arranged to be capable of communicating at least with the network controller 120 and with one or more beacon devices 130A, 130B, 130C. For example, the terminal device 110 may be arranged to communicate with Wi-Fi technology and with Bluetooth technology.

Figure 7:
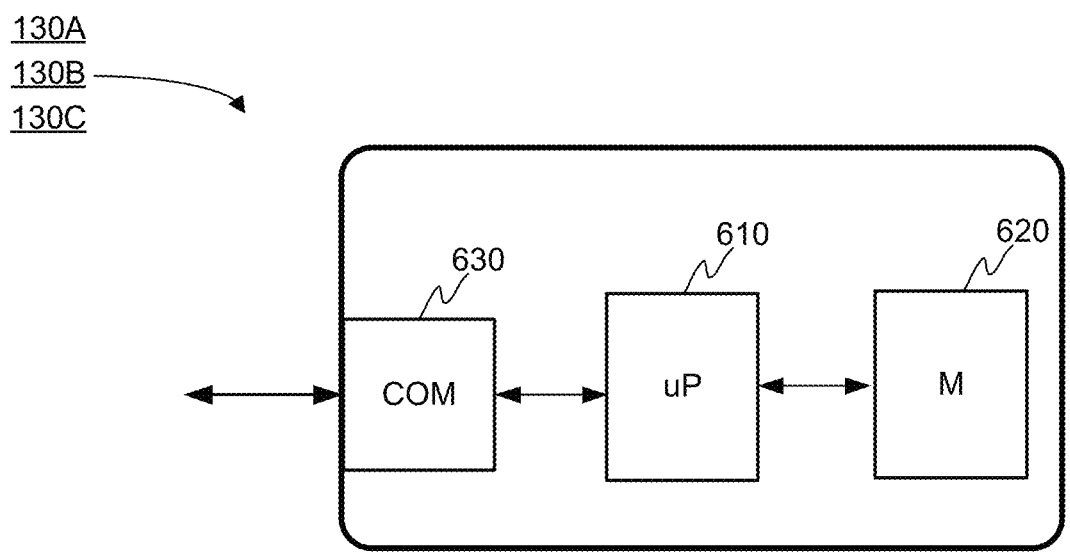
FIG. 7 illustrates schematically a beacon device according to an embodiment of the invention.

FIG. 7, in turn, illustrates schematically an example of a beacon device 130A, 130B, 130C according to an embodiment of the invention. The beacon device 130A, 130B, 130C may comprise at least one processor 610, at least one memory 620 storing e.g. computer program code and other data and a communication interface 630. The beacon device 130A, 130B, 130C may be controlled by the processor 610 and the communication interface 630 may be arranged to implement a communication technology selected for broadcasting the beacon signal, such as the Bluetooth. The communication interface 630 may also be arranged to enable the communication between the beacon device 130A, 130B, 130C and the network controller 120 at least in the manner as described.

The present invention as described with non-limiting examples herein is at least in part based on an idea in which an access to a network service may be defined based on a position of a terminal device in a manner as described.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for determining an access right to a service hosted by a network node, the method comprising:
   receiving, by a network controller, a service request from a terminal device to access the service hosted by the network node;
   generating, by the network controller, at least one token associated to the service request received from the terminal device;
   transmitting, by the network controller, the at least one token to at least one beacon device to be broadcast by the at least one beacon device over a local area network;
   receiving, by the network controller, a message from a terminal device over the local area network, the message comprising data interpretable as a token, data from which the at least one beacon device is identifiable and data from which a position of the terminal device is derivable, the data from which the position of the terminal device is derived comprises at least one measurement value representing at least one parameter of a signal broadcast by the at least one beacon device experienced by the terminal device; and determining, by the network controller, an access right to the service by:
 determining based on the data interpretable as the token that the network controller has generated the token for the terminal device by querying from a data storage whether or not the data storage stores a session comprising the received token, and
 in response to a detection that the network controller has generated the token for the terminal device:
  determining the position of the terminal device from data from which the at least one beacon device is identifiable and from the data from which the position of the terminal device is derivable, and
  generating, in accordance with a result of a determination that the network controller has generated the token to the terminal device and the position of the terminal device, an indication representing a right to access to the service,
 wherein a verification of a validity of the token in time is performed in determining the access right to the service.

2. The method of claim 1, further comprising generating a session, by the network controller, comprising at least the generated token associated with an identifier of the terminal device.

3. The method of claim 1, wherein the service is provided to the terminal device in response to a detection that the generated indication represents an allowance of a service provision.

4. A network controller comprising:
 at least one processor;
 at least one memory including computer program code;
 the at least one memory and the computer program code configured to, with the at least one processor, cause the network controller to:
  receive a service request from a terminal device to access the service hosted by the network node,
  generate at least one token associated to the service request received from the terminal device,
  transmit the at least one token to at least one beacon device to be broadcast by the at least one beacon device over a local area network,
  receive a message from a terminal device over the local area network, the message comprising data interpretable as a token, data from which the at least one beacon device is identifiable and data from which a position of the terminal device is derivable, the data from which the position of the terminal device is derived comprises at least one measurement value representing at least one parameter of a signal broadcast by the at least one beacon device experienced by the terminal device, and
  determine an access right to the service by:
   determining based on the data interpretable as the token that the network controller has generated the token for the terminal device by querying from a data storage whether or not the data storage stores a session comprising the received token, and
   in response to a detection that the network controller has generated the token for the terminal device:
    determining the position of the terminal device from data from which the at least one beacon device is identifiable and from the data from which the position of the terminal device is derivable, and
    generating, in accordance with a result of a determination that the network controller has generated the token to and the position of the terminal device, an indication representing a right to access to the service,
  wherein a verification of a validity of the token in time is performed in determining the access right to the service.

5. The network controller of claim 4, the network controller is further configured to:
 generate a session comprising at least the generated token associated with an identifier of the terminal device.

6. The network controller of claim 4, wherein the network controller is configured to provide the service to the terminal device in response to a detection that the generated indication represents an allowance of a service provision.

7. A communication system comprising:
 at least one network controller, and
 at least one beacon device configured to communicate over a local area network,
 wherein the at least one network controller is configured to:
  receive a service request from a terminal device to access the service hosted by the network node,
  generate at least one token associated to the request from the terminal device,
  transmit the at least one token to at least one beacon device to be broadcast by the at least one beacon device over the local area network,
  receive a message from a terminal device over the local area network, the message comprising data interpretable as a token, data from which the at least one beacon device is identifiable and data from which a position of the terminal device is derivable, the data from which the position of the terminal device is derived comprises at least one measurement value representing at least one parameter of a signal broadcast by the at least one beacon device experienced by the terminal device, and
  determine an access right to the service by:
   determining the data interpretable as the token when the network controller has generated the token for the terminal device by querying from a data storage whether or not the data storage stores a session comprising the received token, and
   in response to a detection that the network controller has generated the token for the terminal device:
    determining the position of the terminal device from data from which the at least one beacon device is identifiable and from the data from which the position of the terminal device is derivable, and
    generating, in accordance with a result of a determination that the network controller has generated the token to the terminal device and the position of the terminal device, an indication representing a right to access to the service, and
 wherein the at least one beacon device is configured to broadcast the at least one token received from the at least one network controller, and wherein a verification of a validity of the token in time is performed in determining the access right to the service.

8. A non-transitory computer-readable medium on which is stored a computer program product for determining an access right to a service characterized in that the computer program product, when executed by at least one processor, cause a network controller to:

receive a service request from a terminal device to access the service hosted by the network node;

generate at least one token associated to the service request received from the terminal device;

transmit the at least one token to at least one beacon device to be broadcast by the at least one beacon device over a local area network;

receive a message from a terminal device over the local area network, the message comprising data interpretable as a token, data from which the at least one beacon device is identifiable and data from which a position of the terminal device is derivable, the data from which the position of the terminal device is derived comprises at least one measurement value representing at least one parameter of a signal broadcast by the at least one beacon device experienced by the terminal device; and determine an access right to the service by:
  determining based on the data interpretable as the token that the network controller has generated the token for the terminal device by querying from a data storage whether or not the data storage stores a session comprising the received token, and
  in response to a detection that the network controller has generated the token for the terminal device:
    determining the position of the terminal device from data from which the at least one beacon device is identifiable and from the data from which the position of the terminal device is derivable, and
    generating, in accordance with a result of a determination that the network controller has generated the token to the terminal device and the position of the terminal device, an indication representing a right to access to the service, wherein a verification of a validity of the token in time is performed in determining the access right to the service.

* * * * *